F. L. KEPPLER.
GLASS CONSTRUCTION UNIT.
APPLICATION FILED NOV. 12, 1917.

1,386,409.

Patented Aug. 2, 1921.

Witness.
Edward T. Wray.

Inventor.
Frederick L. Keppler.
by Parker & Carter
Attorneys.

UNITED STATES PATENT OFFICE.

FREDERICK L. KEPPLER, OF NEW YORK, N. Y.

GLASS CONSTRUCTION UNIT.

1,386,409.  Specification of Letters Patent.  Patented Aug. 2, 1921.

Application filed November 12, 1917. Serial No. 201,683.

*To all whom it may concern:*

Be it known that I, FREDERICK L. KEPPLER, a citizen of the United States, residing at New York, in the county of New York and State of New York, have invented a certain new and useful Improvement in Glass Construction Units, of which the following is a specification.

My invention relates to improvements in structural glass units, and has for one object to provide a structural unit possessing great strength and capable of complete and perfect annealing. Another object is to produce a glass structure unit which can be made of ordinary transparent glass which will permit light to pass through it but which cannot be seen through. Other objects will appear in the specification from time to time.

My invention is illustrated more or less diagrammatically in the following drawings, wherein—

Fig. 2 is a form particularly adapted for use in pavements, skylights and the like;

Like parts are indicated by like characters in all the figures.

I have shown four different forms of my invention. They all embody the same general characteristics. They all can be used interchangeably but for certain specific purposes where large numbers are used it is worth while to work out special forms, and it is those special forms which I have here illustrated for the purpose of making the whole matter a little more clear and more satisfactory to all concerned.

Figure 1:
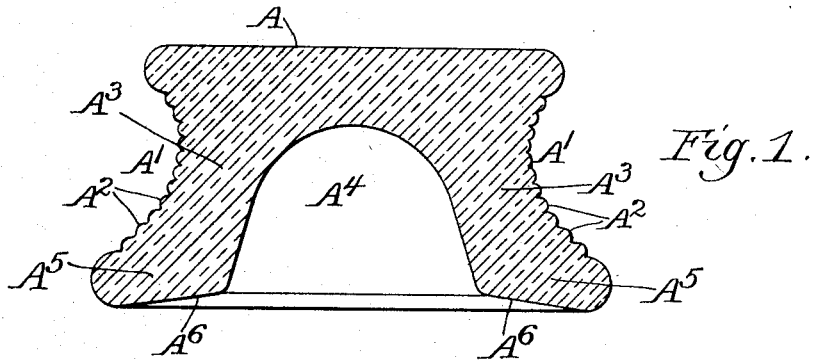
Figure 1 is a form of unit which may be used either as a partition or as a paving light.
Figure 2:
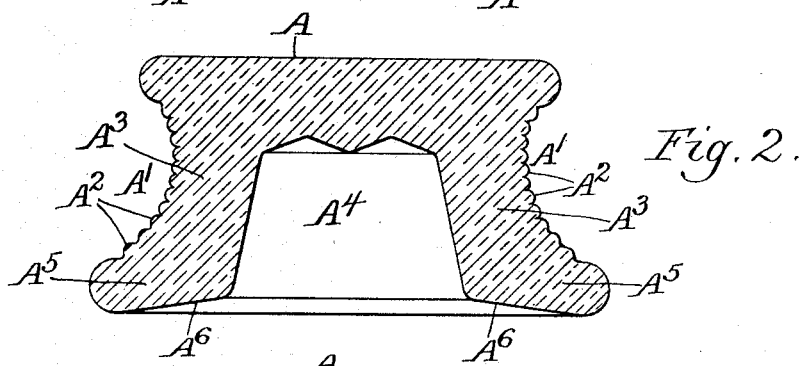
Figure 3:
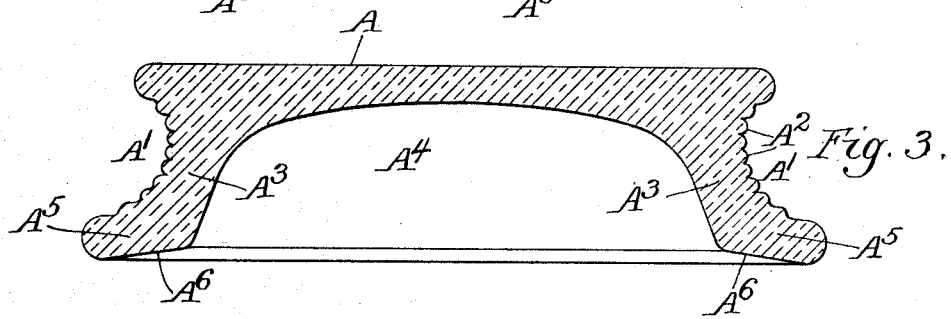
Fig. 3 is a form particularly adapted for partition walls.

The forms of Figs. 1, 2 and 3 in particular are rather closely similar and a description of one will suffice for all three.

Each of these glass units may be described as a substantially square block with a depression in it. This block has one flat outside surface A. This flat surface would be the outer wall if the block was built into a building. It would be the upper surface if the block was built into a skylight. It would be the bearing surface if the block was built into a floor or pavement. The block is bounded on all four sides adjacent the flat surface A by an inwardly and then outwardly curved surface $A^1$ corrugated as at $A^2$ in order that structural or plastic materials into which the block is built may have a better hold. These corrugated surfaces $A^1$ form the outer boundaries of flaring walls $A^3$ which surround four sides of a depression $A^4$ which depression is bounded at its bottom by what may be called the body of the block. These walls $A^3$ terminate in enlarged or thickened flange like portions $A^5$ which portions are bounded on the sides opposed to the smooth surface A by inclined surfaces $A^6$. These surfaces may be inclined inwardly toward the center, or outwardly, or some may be inclined inwardly and some outwardly.

Attention is called to the fact that a very large part of the mass of glass of which the block is made is concentrated in these flanges $A^5$ and there is a tendency toward reducing the mass of glass at the bottom of the depression. The purpose of this is to promote uniform annealing and solidifying of the glass after it has been taken from the mold. It will be understood that the central portion of the block at the bottom of the depression is protected by the walls surrounding the depression and by the body of glass from air currents, and thus there is a tendency for this part of the glass to stay molten longer than the remainder, and this is in sharp contrast with the tendency of the part $A^5$ of the glass unit to harden rapidly because that is is exposed on all three sides. In order to equalize this situation I mass a comparatively large quantity of glass into the flanges $A^5$. The result is that hardening is substantially simultaneous throughout the entire block. This results in an even annealing throughout the block and prevents the formation of internal initial stresses which might ultimately result in fracture. In other words, by shaping my block as I have shaped it, the side walls would be annealed and particularly at the upper edges more rapidly than the body of the unit because the air would strike them first, and in order to prevent this I have made the side walls thicker particularly at the upper edges and have provided them with enlarged portions whereby there will be a sufficient mass of material to slow down the annealing process. The particular proportions depend of course upon the size and shape of the block, the character of the glass, and the conditions under which it is manufactured.

I have arranged my unit so that when it is built up into a wall or partition it will not interfere with the transmission of light but will not be transparent. I get this result by inclining very slightly the surface of one side with respect to the surface on the other. The surfaces are left perfectly smooth and unobstructed. The glass can easily be cleaned, but still this slight change in inclination assisted by the curved contour of the boundary walls of the glass block is sufficient to make it impossible to see through. In other words, it is only necessary to arrange the parts so that light rays entering the glass can not be directly reflected through it as through a prism, because in glass they are interrupted by other surfaces which break up the rays.

Figure 4:
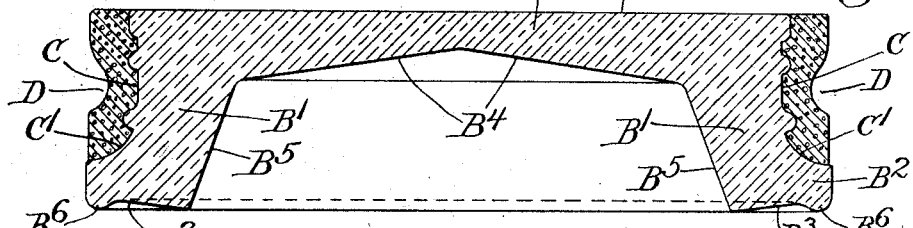
Fig. 4 is a form particularly adapted for partition walls.

In the modified form shown in Fig. 4 the glass unit generally similar to the forms of Figs. 1, 2 and 3, has a central flat body portion B surrounded on all four sides by thick heavy downwardly and outwardly flaring walls $B^1$ terminating in overhanging flanges $B^2$. These flanges are bounded by inclined surfaces $B^3$ extending outwardly and inclined back toward the body B. The body B itself is provided with inclined surfaces $B^4$ on the same side as the flanges $B^1$, and the flanges $B^1$ are bounded by inclined surfaces $B^5$. These surfaces of course are not joined by shaped angles but curved off or arranged so that they merge into one another.

The surfaces $B^3$ terminate in a bead $B^6$ surrounding the outer perimeter of the glass unit and are adapted to hide the cement joint between adjacent units when they are built into a wall or other structure.

This block is bounded about its periphery by surfaces C, C perpendicular to the body B. These surfaces merge into curved surfaces $C^1$ on the flanges $B^1$. These surfaces are corrugated as indicated and the block may be built into a structure by bringing them together and filling the spaces between adjacent blocks with mortar. However, glass is impervious to moisture and has no suction so called, and the mortar therefore dries or sets very slowly and it becomes necessary to provide supports for the units to hold them in position while the mortar or cement is setting.

In order to make these supports unnecessary, I surround the glass unit before it leaves the factory with a cushion of cement. This cushion is put on at the factory where the units are made and before they are shipped for use. It surrounds the peripheral walls of the unit leaving uncovered that portion of the unit which comes most closely in contact with adjacent units with which it is set up.

This cushion as it is put on the unit, is left with a slight depression D as indicated, so that when the separate units are put in a structure there is room for the reinforcing and room for a small amount of cement to tie them together and tie the reinforcing material in place. It is however a relatively small body of cement and so the porous cement cushion on the unit before it is assembled, is enabled to absorb such moisture as is necessary to insure the rapid setting of the structure and obviate the necessity of the supporting frame.

I claim:—

1. As a new article of manufacture a glass tile comprising a relatively thin portion, downwardly depending edges having corrugated outer surfaces, a band of cement material let into said corrugations, the outer surface of said band being channeled.

2. As a new article of manufacture a glass tile comprising a relatively thin flat portion, downwardly depending edges, a glass flange projecting from said edges about their outer periphery, a cement band permanently secured to said edges about their outer periphery, and substantially flush with the glass flange, said cement band being channeled about its outer surface.

3. As a new article of manufacture, a glass tile, the periphery of said tile being channeled, a band of cement material let into said channel, the outer surface of said band being channeled.

In testimony whereof, I affix my signature in the presence of two witnesses this 8th day of November, 1917.

FREDERICK L. KEPPLER.

Witnesses:
MAURICE KEANE,
MARY MEAGHER.